United States Patent [19]
Gaug

[11] 3,969,474
[45] July 13, 1976

[54] MOLDED STEEL RULE DIE FOR ROTARY DIE CUTTING

[76] Inventor: John R. Gaug, 9229 Ivanhoe St., Schiller Park, Ill. 60176

[22] Filed: Sept. 10, 1971

[21] Appl. No.: 179,404

Related U.S. Application Data

[63] Continuation-in-part of Ser. No. 813,831, April 7, 1969, abandoned.

[52] U.S. Cl. .............................. 264/219; 264/261; 264/264; 264/271; 264/274; 264/275; 264/277; 264/278; 264/299
[51] Int. Cl.² .................... B29C 1/02; B29C 5/00; B29D 3/00
[58] Field of Search .................. 76/107 C, 107 R; 93/58 R, 58.2 R; 249/83, 97; 264/277, 278, 219, 274, 275, 299; 83/332, 665, 674, 675, 698

[56] References Cited
UNITED STATES PATENTS

| | | | |
|---|---|---|---|
| 2,863,337 | 12/1958 | Ackley | 83/665 UX |
| 2,993,421 | 7/1961 | Philips et al. | 264/219 X |
| 3,108,327 | 10/1963 | Philips et al. | 249/83 |
| 3,302,490 | 2/1967 | Bishop | 76/107 C |
| 3,598,010 | 8/1971 | Chambon | 76/107 C |

Primary Examiner—Willard E. Hoag
Attorney, Agent, or Firm—Rummler & Snow

[57] ABSTRACT

A method of forming a steel rule die for the high speed rotary cutting and creasing of foldable carton blanks, characterized by the repeat accuracy of the die forming process, simplicity of assembly and operation for rotary die cutting procedures, and ease of maintenance. In carrying out the process, the rules of the die to be formed are initially set in their final cutting or working position with their cutting edges against a precisely formed, cylindrically curved mold surface, locked in place by removable spacer blocks and furniture of a solid and rigid material, and then permanently bonded into a rigid base with the working edges exposed, upon removal of the spacer blocks, for die cutting operation when the base is mounted on the surface of a rotary press cylinder.

7 Claims, 5 Drawing Figures

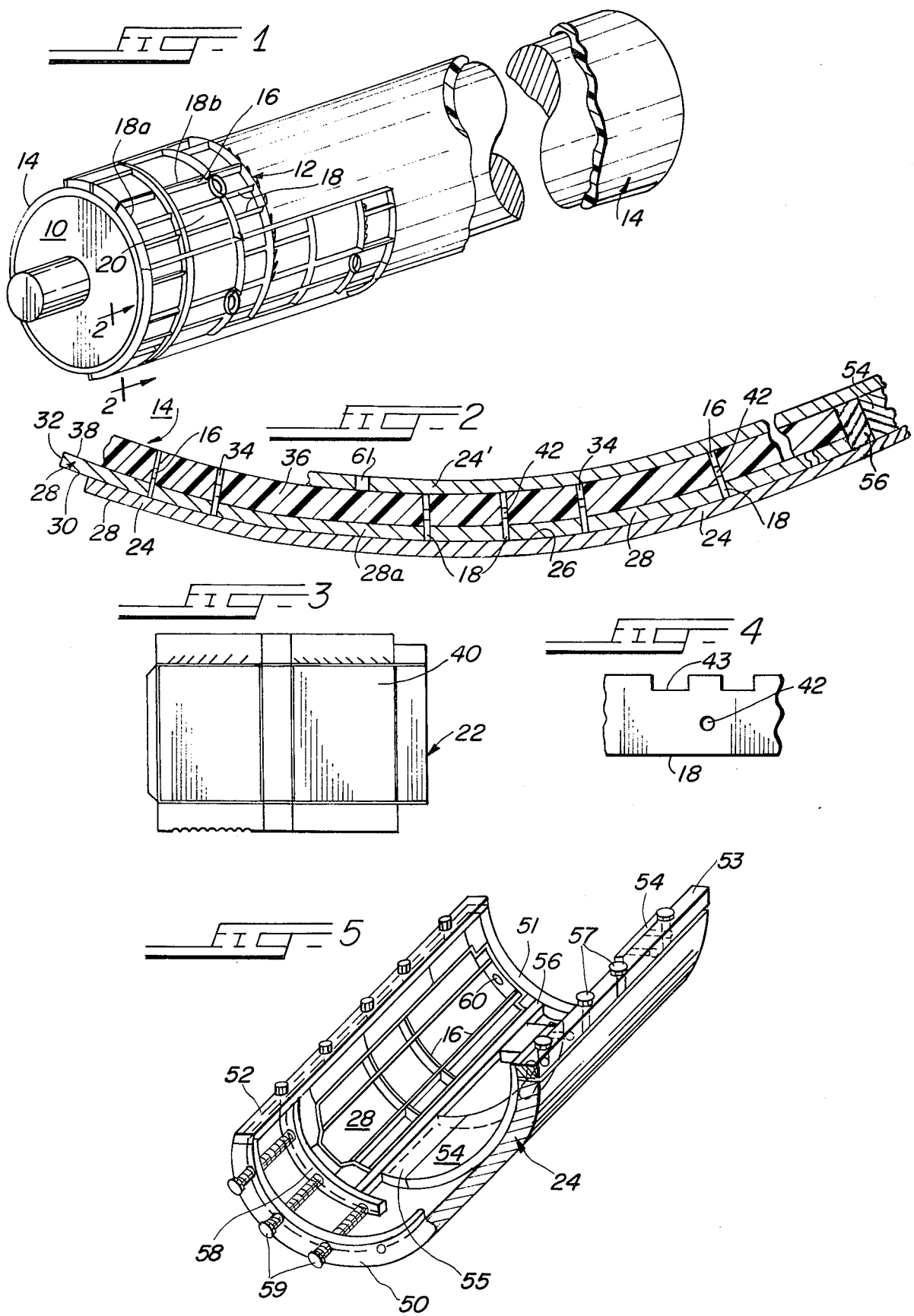

MOLDED STEEL RULE DIE FOR ROTARY DIE CUTTING

REFERENCE TO RELATED APPLICATION

This application is a continuation-in-part of my copending application Ser. No. 813,831, filed Apr. 7, 1969, and now abandoned.

BACKGROUND OF THE INVENTION

The background of this invention is fairly represented by U.S. Pat. Nos. 3,000,237, 3,063,349, 3,108,327 and 3,112,164, wherein various methods are disclosed for forming molds for use in making duplicate steel rule dies adapted to be grouped for gang-forming of cardboard blanks by means of reciprocating, flatbed-type press apparatus.

Although such dies formed by the methods disclosed in the before mentioned patents and by other methods have been used successfully for many years to form foldable carton blanks, a particular difficulty resides in the fact that the individual dies do not exactly repeat the design pattern for the rules of the die, even though the individual dies are all made from a common mold, with the result that the blanks cut from an assembly of these dies in a gang-forming operation may vary in critical dimensions. A particular reason for this is that the basic mold itself becomes worn from the placement of the successive set of rules to be cast into the rigid base of the working die. Thus, because of the lack of repeat accuracy in the prior die making methods, it has been the practice to number or otherwise identify the blanks formed from the individual dies comprising an assembly thereof and to keep the carton blanks so formed separate so that production can be allocated to specified automatic carton filling machines properly and individually adjusted to receive the same. The filling machines operate with such close tolerance that very often they cannot use the mixed blanks from multiple die blanking operations. A similar problem often arises with the automatic folding and glueing equipment which is designed to take cartons of particular dimensions.

These and other difficulties in the prior procedures for making duplicate steel rule dies have confined the use of such dies to flat-bed reciprocating presses and the more economical, high speed production of the rotary press type of apparatus has, in the main, been unavailable to the steel rule die cutting art. A particular reason for this is the very high cost of constructing a rotary blanking die by conventional methods and the inability, heretofore, of molding duplicate curved dies for a gang-forming operation by rotary press means.

Thus the instant invention has as its main objective a method of forming duplicate dies designed for high speed rotary press operation which also overcomes the before mentioned problems and assures that each die in an assembly thereof will be exactly like all of the others in all critical dimensions.

Although the present invention is concerned principally with producing dies for rotary presses, the method in its broadest aspects is not limited to dies for rotary presses.

SUMMARY OF THE INVENTION

The present invention concerns the provision of a simple method of forming a multiplicity of individual steel rule dies assigned to be mounted on the cutting cylinder of a rotary press for a gang-forming operation, the method steps involving setting the rules with their working edges in their final operating position relative to the finished surface of a cylindrically curved concaved mold dimensioned to complement the surface of the rotary press cylinder onto which the dies are to be mounted, holding the working edges of the rules in a precisely dimensioned pattern by means of accurately formed solid spacer blocks curved to fit the surface of the mold and of less than half the height of the rules, and then permanently bonding the base ends of the rules within a solid and rigid base or backing formed from a suitable plastic material. Each die is thus formed as a one piece unit of rules and support base or backing in the exact configuration in which it will be used in a blank cutting operation. The dies of this invention are thus formed so accurately that there is no longer any necessity for coding the dies or the blanks produced therefrom since all of the blanks, whether formed from single or multiple dies or form single and multiple replacement dies, are dimensionally identical.

In practicing this invention, the only requirements are a master mold or form having an accurately formed cylindrically concaved working surface dimensioned to complement the rotary press cylinder on which the dies are to be mounted, the rules, precisely formed spacer blocks to hold the rules in the desired pattern, a material such as a resin for forming the permanent die body around the base ends of the rules, and an inner or male mold part for forming the back of the die body to fit the surface curvature of the cylinder on which it is to be used. The finished working surface of the master mold functions to orient the working edges of the rules in the desired curve configuration for use in a rotary blank cutting machine and the master spacer blocks function to simultaneously orient the working edges of the rules over the working surface of the master mold and establish the height at which the rules extend from the permanent body holding the base portions of the rules. Once the die body has been formed and solidified about the base portions of the rules, the lock-up elements, which hold the rules and spacer blocks in the mold, can be released and the finished die lifted from the mold. The spacer blocks are then removed leaving the rules firmly and accurately fixed in the die body with their working edges exposed and projecting therefrom in precise cutting and creasing relationship and precisely according to the desired pattern.

Thus a single master mold and a single set of spacer blocks can be used for the formation of any number of cylindrically curved dies there being no wear on the master mold other than that imparted by occasional cleaning. Further, only one such mold need be provided for each rotary press in accordance with the diameter of the plate or die carrying cylinder thereof and it is only necessary to provide a single set of spacer blocks for each design or configuration of the blanks to be struck from the sheets of cardboard stock, since they can be used repeatedly to make any number of dies without any variation in pattern dimensions. Another advantage is that the master mold and the spacer blocks are formed from hard surfaced materials which will hold their dimensions permanently. Accordingly, repeat accuracy of die production is assured.

DESCRIPTION OF THE DRAWING

An illustrative embodiment of this invention is shown in the accompanying drawing, in which:

FIG. 1 is a perspective view showing the working edges of the rules of a plurality of dies formed according to the invention and mounted on the surface of a rotary press plate-cylinder;

FIG. 2 is a fragmentary cross-sectional view of a die section in the master mold form during the formation of the resin base for the rules of the die;

FIG. 3 is a plan view of a typical carton blank formed by a die such as that shown in FIG. 1;

FIG. 4 is a fragmentary view of a rule for use in the improved method of making a blanking die; and FIG. 5 is a perspective view of a concaved mold according to the invention showing how the rules for a die are positioned and held in the mold by suitable furniture and lock-up bars, as in a conventional chase.

THE PREFERRED EMBODIMENT

A preferred embodiment of this invention is shown in the drawings illustrating a rotary die-cutting cylinder 10 for use in a rotary die-cutting machine and comprising a plurality of individual dies 12 each including a resin or plastic base 14 and a number of steel rules 16 having their working edges 18 extending outwardly and spaced from the cylindrical outer surface 20 of the die body or backing. The entire assembly of dies 12 is generally cylindrical in shape being formed by a number of the individual dies 12 mounted side-by-side and end-to-end on a rotary press cylinder 10 to form the complete diecutting means. For purposes of simplicity in illustrating the invention, the cylinder mounting and drive, and the details of the means that would be used to mount the various die members 12 making up the complete rotary die cylinder, have been omitted. Means for mounting printing plates on rotary press cylinders are well known in the art and such means may be adapted for securing the dies of the present invention. Also, provision can be made to screw or bolt the dies 12 to the plate cylinder 10 if desired.

Only a portion of the die assembly comprising one of the diecutting cylinders 10 is shown in FIG. 1. The die assembly can be formed in any desired size and may be adapted to cut and form per revolution any desired number of blanks from a strip of cardboard or other sheet material, in side-by-side or end-to-end relationship, within the cylindrical surface area of the cylinder 10. The die cylinder 10 can also have the dies 12 spaced thereabout to cut blanks in an intermittent manner, as by running spaced sheets of suitable material therethrough. The working edges 18 of the die rules can be cutting or creasing edges or both as is known in the art. Thus, in order to form the blank 22 shown in FIG. 3, the edges 18a is a cutting edge while an example of a creasing edge would be the edge 18b.

Referring to FIG. 2, there is shown an arcuate master mold 24 having a uniform smooth and unbroken inner working surface 26, and a series of rule spacing and holding blocks 28 having accurately formed outer surfaces 30 and edges 32 abutting against the working edge margins of the rules 16, the base ends 34 of which are encased in the resin layer 36 which comprises the die base or body 14. The inner surfaces 38 of the spacer blocks 28 need not be finished, as are the outer surfaces 30 and the edges 32, and can bear indicia to identify each in accordance with the pattern or plan for the carton blank 22 which the die is to reproduce. Thus, for example, the block 28a shown in FIG. 2 can represent the space 40 of the blank 22 shown in FIG. 3. Preferably the spacer blocks outer surface 30 is curved to fit the finished surface 26 of the mold.

As shown, the master mold form 24 comprises an accurately formed metal shell of cylindrical curvature having a true inner radius defining the working surface 26 and a sufficient surface area upon which to form the die member 12 for at least one carton blank. The radius of the working surface 26 of the master mold must be precisely equal to the radius of the press cylinder that will carry the dies plus the width of the cutting rules. The size of the master mold, that is the area of the working surface, preferably will be sufficient to accommodate the pattern of the largest carton blank likely to be made by the press cylinder for which the mold is radially dimensioned and since a master set of spacing blocks 28 is formed for each carton blank design, only one master mold 24 need to be used to make all of the dies 12 needed to form a complete gang-forming rotary die assembly for the plate cylinder 10. Because the spacing blocks 28 are accurately formed or machined from rigid and hard material, each spacing block comprising a complete pattern can be duplicated to form several sets of blocks for the same carton design and if desired, and the carton design is small enough, several sets may be used simultaneously on a master mold form 24 to hold the rules and form a multiple segment die in one casting of the material forming the die base or backing.

In general the die-cutting cylinder 10 may be any diameter within the range of about 6 to 24 inches and in any case the radius of curvature for the mold 24 will be the radius of the cylinder 10 plus the width or height of the rules 16. In one embodiment of steel rule die according to the invention the rules are ⅜ inch wide, the radius of the cutting cylinder is 12 inches, and the radius of curvature for the mold surface 26 is 12 ⅜ inches. In such case the thickness of the spacer blocks is ⅛ inch and, generally, the spacer block thickness is made about one-third the width of the rules.

In assembly, the master mold form 24 is positioned to receive the spacer blocks 28 in accordance with the set pattern for a desired carton design, as shown by their markings or indicia, for example. The rules 16 are positioned between the spacer blocks 28 with their working edges 18 supported by the mold surface 26 and with their base end portions 34 protruding radially inwardly or upwardly therefrom. As will be understood by those skilled in the steel rule die making art, the working edges of the cutting rules will bear directly against the finished mold surface 26 and the working edges of the creasing rules will be supported by shims of suitable thickness disposed between the said working edges and the mold surface to provide the proper difference in height between cutting edges and creasing edges in the finished die. In such cases the width of the creasing rules will be less than that of the cutting rules by the thickness of the board stock that the die is to cut. On the other hand, when the rules are all of the same width, cutting and creasing, the makeready for the impression cylinder will be made with a groove opposite each creasing rule into which the material of the board can be pressed to form the creases in the carton blank. These are conventional and well known practices in the steel rule die cutting art.

The inner surfaces 38 of the spacer blocks can be treated with a mold release composition, such as a wax, but the base ends 34 of the rules 12 are not so treated since the plastic backing material must permanently adhere to the rules and firmly integrate them with the die base or body. Finally, an inner or male mold closure member or shell 24' is positioned over the assembled rules and spacer blocks and clamped or otherwise secured in place. The master mold assembly is then ready for the formation of the plastic base means or die body 36 which may be poured or injected into the mold assembly by any suitable manner and allowed to cure or set. If desired, the inner mold part 24' may be a cylinder of the same size as the cutting cylinder. In any event, however, the mold will be no more than a semi-circle in cross section and the inner part is simply lifted out of the mold, as is the finished die, when the die body has become solidified. The spacer blocks 28 can then be removed radially from the finished die and the die is ready for mounting on the cutting cylinder by any suitable means.

As shown in FIG. 5, the master mold 24 is a semi-cylindrical shell, usually of an overall length less than that of the cutting cylinder, and since the mold also functions as a chase, within which the die forming elements are to be firmly held, the mold shell is provided with semi-circular end members 50–51, securely fastened to the respective ends of the shell 24, and longitudinal edge bars 52 and 53. The edge bar 52 in the form of mold shown is bolted firmly onto the respective longitudinal edge of the shell 24 and overhangs the mold edge inwardly a distance precisely equal to the width of the cutting rules 16. Likewise, the end members 50–51 project radially inward of the mold surface 26 by an amount exactly equal to the cutting rule width.

In the mold structure shown, the edge bar 53 is of the same width as the mold shell is thick and this bar 53 has bolted to its inner edge a pair of cylindrically curved lock-up plates 54 which extend inwardly, toward bottom center of the mold, along the inner surface of the mold. These lock-up plates 54 serve, with suitable furniture pieces 55, to force a longitudinal lock-up bar 56 into angularly directed clamping engagement with the rule and spacer-block assembly disposed between the bar 56 and the fixed edge bar 52. Clamping pressure on the longitudinal lock-up bar 56 is applied by means of bolts 57 which force the edge bar 53 toward the respective edge of the mold shell 24.

For clamping action in the longitudinal direction of the mold, a lock-up member 58 of circular curvature is provided to bear longitudinally against the assembly of rules, spacer blocks, and furniture onto which the die body is to be cast. Bolts 59 threaded through the end member 50 bear on the lock-up member 58 to apply clamping pressure and in this case the longitudinal lock-up bar 56 must be cut to proper length to accommodate the assembly of parts onto which the die body is to be formed.

It is important to notice that very firm clamping pressure must be applied to the rule and spacer-block assembly because it is seldom that the working edge of a piece of steel rule stock is perfectly straight or truly curved. Thus, to precisely follow the desired pattern, the working edges of the rules must be very firmly clamped between the edges of the spacer-blocks, which are true, to remove any deviation from the pattern lines. This is a feature of the present invention which materially contributes to the repeat-accuracy characteristic of the dies made according to my invention.

For a like reason, all mold members, lock-up bars and furniture which project above the mold surface 26, except the spacer-blocks, must be precisely the same thickness as the width or height of the rules so that when the inner mold closure member 24' is inserted, its bearing surface will rest firmly on all of the said projecting elements, thus clamping the working edges of the rules firmly against the mold surface and closing the mold tightly for introducton of the plastic material which forms the die body. The plastic material may be injected into the mold through a suitable opening 60 in the end member 51, or if the closure part 24' is a shell, as shown in FIG. 2, the plastic body material can be introduced through suitable openings such as that indicated at 61.

In order to permit the flow of the plastic material throughout the mold assembly and into each cavity between the rules 16, each rule is provided with apertures 42 spaced along the length of the rule and the back margin of the rule is notched in a suitable manner, such as is indicated at 43 in FIG. 4. The apertures 42 also provide a mechanical interlock between the rules and the molded die body and, if desired, a further bond can be had by the application of suitable bonding agents at the rule and body material interfaces.

Any of a variety of rigid, hard or machinable, or castable compositions, metals and metal alloys, all adapted to be formed with accurate working surfaces, corners and edges, can be used to form the spacer blocks 28. These members can be formed in situ from casting compositions and subsequently machined to the desired dimensions or formmed from commercially available sheet stock. The only requirement for these materials is that they can be accurately formed as permanent rigid solid members and machined or polished and ground, if desired, to close tolerances and that they maintain these dimensions during use.

The resin base 14 can be of a number of commercially available plastic materials. Epoxy resins with a hardener (ratio 10:1) such as Epolite 30 and 922B. Resolin can be used. Other examples are the proprietary epoxy resin product known as EPOTUF 37-130 and the polyamide epoxy resin hardener known as EPOTUF 37-620, which are commercially available products. Various fillers such as fiberglass, silica and metal chips can be used in the resin base. Normally resins are used which cure and harden at about room temperature in a matter of two to three hours so that thermal effects are avoided and lock-up times are shortened.

I claim:

1. A method of making a die adapted for use in cutting blanks from sheet material comprising: positioning steel rules in a mold, said mold having a smooth, hard, unbroken and accurately formed surface, each of a plurality of said rules having a cutting edge abutting said surface, positioning at least one machined metal spacing member between said rules next to said surface and clamping said rules and spacing member in face to face position in said mold by pressure exerted laterally against said rules and spacing member, said spacing member being of less thickness than the height of said rules, casting and solidifying a resin composition against the portions of said rules extending above said spacing member, thereby forming a base having said rules attached thereto, and then separating said base and rules from said spacing member and said mold.

2. The method of making a die as claimed in claim 1, wherein said surface is cylindricallly curved and concave and said spacing member has a curved surface conforming with and fitting against said curved surface of the mold.

3. The method of making a die as claimed in claim 1, wherein the pressure exerted against said rule and spacing member is sufficient to remove any deviation of said cutting edges from the desired pattern.

4. The method of making a die as claimed in claim 1, wherein said rules extend in different directions and some of said rules are creasing rules with their working edges placed contiguous to said surface of the mold, there are a plurality of spacing members each shaped to bear flatly against the surfaces of the adjacent rules, and said clamping pressure extends at right angles to the directions of said rules.

5. The method of making a die as claimed in claim 1, wherein said surface is cylindrically curved and concave, said rules extend in different directions, and said clamping pressure is exerted in different directions normal to the major flat surfaces of the rules.

6. The method of making a die as claimed in claim 5, wherein some of said rules are creasing rules with their working edges placed contiguous to said surface of the mold, using the surface of the mold as a base of reference for placing said creasing edges, placing a plurality of spacing members between said rules said members having curved bottom surfaces fitted against said curved surface of the mold and each having side surfaces shaped to bear against the side surfaces of the adjacent rules, and said clamping pressure against said rules removes any deviation of the cutting and creasing edges from the desired pattern.

7. The method of making a die as claimed in claim 6, wherein said clamping pressure is exerted longitudinally and transversely of the mold and a curved mold closure member is placed over said rules with a convex face of said closure member bearing against the base edges of the rules to hold the working edges of the rules toward said concave surface.

* * * * *